3,227,761
FLUORINE-CONTAINING AMINES
Ralph E. De Brunner, James A. Webster, and Edward S. Blake, Dayton, Ohio, assignors to Monsanto Research Corporation, St. Louis, Mo., a corporation of Delaware
No Drawing. Filed Dec. 26, 1962, Ser. No. 247,340
7 Claims. (Cl. 260—583)

This invention relates to fluorine-containing amines and more particularly provides certain new and valuable aliphatic polyfluoroalkyl diamines and the method of preparing the same. The invention also provides functional fluid compositions comprising some of the new compounds, and methods of actuating a power-transmitting device wherein said compositions are employed.

According to the invention, the presently provided diamino compounds are prepared by the reaction of an alkylene diamine of the formula

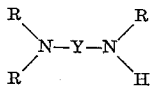

where R is selected from the class consisting of hydrogen and alkyl of 1 to 8 carbon atoms and Y is alkylene having at least 2 carbon atoms in the alkylene chain and a total of from 2 to 8 carbon atoms, with a (perfluoroalkyl) alkyl halide of the formula

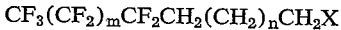

where $m$ is a number of 1 to 5, $n$ is a number of 1 to 4 and X is halogen having an atomic weight greater than 19. The reaction occurs by replacement of amino hydrogen by the $CF_3(CF_2)_mCF_2CH_2(CH_2)_nCH_2-$ radical and liberation of hydrogen halide. Depending upon the available amino hydrogen atoms and the quantity of the fluorinated alkyl halide reactant, from 1 to 4 of the (perfluoroalkyl) alkyl radicals are introduced into the diamine, the product thus obtained having the formula

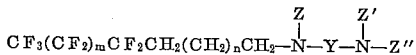

wherein $m$, $n$ and Y are as defined above, and Z, Z' and Z'' are selected from the class consisting of hydrogen, alkyl of 1 to 8 carbon atoms and

When working with diamines wherein one or both of the amino groups are primary, the product may be a mixture of the N-(polyfluoroalkyl)alkylenediamines, N,N- or N,N'-bis(polyfluoroalkyl)alkylenediamines, N,N,N'-tris(polyfluoroalkyl)alkylenediamines, and N,N,N',N'-tetrakis(polyfluoroalkyl)alkylenediamines, since introduction of the first N-substituent facilitates further substitution. However, the extent of substitution can generally be controlled to give a predominance of one product by suitable selection of halide to diamine ratio. Using a 1:1 molar ratio of the reactants, monosubstitution prevails. Similarly, using a 4:1 halide to diamine ratio, the predominant product is the N,N,N',N'-tetra-substituted amine. Products of various degrees of substitution are readily separated from each other by fractional distillation, or crystallization, solvent extraction, etc. For many applications, for example, for use as antioxidant additive for hydrocarbon lubricants, mixtures of the variously substituted compounds are useful. Hence isolation of any one polyfluoroalkylated diamine is unnecessary. For use as functional fluid per se, the tertiary diamines are preferred. Production of the completely substituted compounds, i.e., the tetrakis(polyfluoroalkyl)alkylenediamines, almost exclusively, is simply a matter of assuring the presence of ample halide to permit substitution and then allowing the reaction to proceed until hydrogen halide is no longer formed or there is no other evidence of reaction.

Reaction of partially alkylated alkylene diamines proceeds similarly, the extent of substitution being governed by the available replaceable hydrogen and the molar ratio of reactants. There are thus obtained compounds having from 1 to 3 (perfluoroalkyl)alkyl groups substituted at the amino radical or radicals, e.g., N-alkyl-N'-(polyfluoroalkyl)alkylenediamines,
N-alkyl-N-(polyfluoroalkyl)alkylenediamines,
N,N-dialkyl-N'-(polyfluoroalkyl)alkylenediamines,
N,N,N'-trialkyl-N'-(polyfluoroalkyl)alkylenediamines,
N-alkyl-N'N'-bis(polyfluoroalkyl)alkylenediamines,
N,N-dialkyl-N',N'-bis(polyfluoroalkyl)alkylenediamines,
N,N'-dialkyl-N,N'-bis(polyfluoroalkyl)alkylenediamines,
and N-(polyfluoroalkyl)-N,N',N'-trialkylalkylenediamines.

The presently useful alkylenediamines include the primary alkylenediamines, e.g., ethylenediamine, 1,3-propanediamine, 2-ethyl-1,3-propanediamine, 1,4-butanediamine, 2-methyl-1,3-butanediamine, 1,5-pentanediamine, 1,6-hexanediamine, 2,5-hexanediamine, 1,7-heptanediamine, 3-methyl-1,6-hexanediamine, and 1,8-octanediamine, and the N-alkyl-substituted diamines having at least one primary or secondary amine group, e.g.,
N-methyl-1,3-propanediamine,
N,N-di-n-butylethylenediamine,
N-ethyl-N'-propyl-1,4-butanediamine,
N,N,N'-trihexyl-1,5-pentanediamine,
N,N'-dibutyl-2-ethyl-1,4-butanediamine,
N,N-dimethyl-N'-octyl-1,6-hexanediamine,
N,N,N'-triisopropyl-1,7-heptanediamine,
N,N,N'-tripropyl-3-methylpentanediamine,
N,N,N'-trimethyl-1,8-octanediamine, etc.

The useful halides may be chlorides, bromides, and iodides. Examples thereof are the (perfluoropropyl) alkyl halides such as 4,4,5,5,6,6,6-heptafluoro-1-iodo- or chlorohexane, 5,5,6,6,7,7,7-heptafluoro-1-bromo- or iodoheptane, 6,6,7,7,8,8,8-heptafluoro-1-bromo- or 1-chlorooctane, 7,7,8,8,9,9,9-heptafluoro-1-iodo- or bromononane; the (perfluorobutyl)alkyl halides such as 4,4,5,5, 6,6,7,7,7-nonafluoro-1-iodo- or bromoheptane or 7,7,8,8, 9,9,10,10,10-nonafluoro-1-bromo- or chlorodecane; the (perfluoropentyl)alkyl halides such as 5,5,6,6,7,7,8,8,9,9, 9-undecafluoro-1-iodo- or bromononane; the (perfluorohexyl)alkyl halides such as 4,4,5,5,6,6,7,7,8,8,9,9,9-tridecafluoro-1-iodo- or chlorononane; the (perfluoroheptyl) alkyl halides such as 5,5,6,6,7,7,8,8,9,9,10,10,11,11,11-pentadecafluoro-1-iodoundecane or 7,7,8,8,9,9,10,10,11, 11,12,12,13,13,13 - pentadecafluoro-1-bromotridecane, etc. Such halides are obtained in known manner by telomerizing an olefin, e.g., ethylene, using a perfluoroalkyl halide as the telomerizing agent.

Some of the mono(polyfluoroalkyl)-substituted alkanediamines provided by the invention are set forth in the following table. Since the products are produced by displacement of amine hydrogen by the

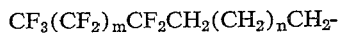

group, the starting materials are obvious by inspection of the formula of the product.

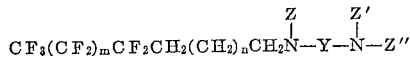

| Z | Z' | Z'' | m | n | Y |
|---|----|-----|---|---|---|
| H | H | H | 1 | 1 | —CH$_2$CH$_2$— |
| H | H | H | 1 | 2 | —CH$_2$CH$_2$— |
| H | H | H | 4 | 3 | —CH$_2$CH$_2$— |
| H | H | H | 2 | 1 | —CH$_2$CH$_2$CH$_2$— |
| H | H | H | 1 | 2 | —CH(CH$_3$)CH$_2$— |
| H | H | H | 1 | 3 | —CH$_2$(CH$_2$)$_2$CH$_2$— |
| H | H | H | 3 | 1 | —CH$_2$CH$_2$CH$_2$— |
| H | H | H | 1 | 2 | —CH$_2$(CH$_2$)$_3$CH$_2$— |
| H | H | H | 2 | 3 | —CH$_2$CH(CH$_3$)CH$_2$CH$_2$— |
| H | H | H | 1 | 1 | —CH$_2$(CH$_2$)$_4$CH$_2$— |
| H | H | H | 1 | 2 | —CH$_2$(CH$_2$)$_5$CH$_2$— |
| H | H | H | 5 | 2 | —CH$_2$(CH$_2$)$_6$CH$_2$— |
| H | H | H | 3 | 2 | —CH$_2$CH(C$_2$H$_5$)CH$_2$CH$_2$— |
| H | H | H | 1 | 4 | —CH$_2$CH$_2$CH$_2$— |
| H | H | H | 1 | 2 | —CH$_2$CH$_2$CH$_2$— |
| H | H | H | 2 | 3 | —CH$_2$(CH$_2$)$_2$CH$_2$— |
| CH$_3$ | CH$_3$ | CH$_3$ | 1 | 1 | —CH$_2$CH(CH$_3$)CH(CH$_3$)CH$_2$— |
| C$_2$H$_5$ | C$_2$H$_5$ | CH$_3$ | 1 | 2 | —CH$_2$CH(C$_4$H$_9$)CH$_2$CH$_2$— |
| C$_4$H$_9$ | C$_4$H$_9$ | C$_4$H$_9$ | 1 | 2 | —CH$_2$(CH$_2$)$_3$CH$_2$— |
| C$_5$H$_{11}$ | C$_3$H$_7$ | C$_3$H$_7$ | 4 | 2 | —CH$_2$(CH$_2$)$_4$CH$_2$— |
| C$_6$H$_{13}$ | H | H | 3 | 2 | —CH$_2$(CH$_2$)$_2$CH$_2$— |
| H | C$_7$H$_{15}$ | H | 1 | 2 | —CH$_2$CH$_2$CH(CH$_3$)CH$_2$CH$_2$— |
| H | H | C$_8$H$_{17}$ | 1 | 2 | —CH$_2$CH$_2$CH$_2$— |
| CH$_3$ | CH$_3$ | H | 5 | 2 | —CH$_2$CH$_2$— |
| iso-C$_3$H$_7$ | H | H | 4 | 2 | —CH$_2$(CH$_2$)$_4$CH$_2$— |

Examples of the presently provided bis(polyfluoroalkyl)-substituted diamines are as follows:

N,N'-bis(4,4,5,5,6,6,7,7,7-nonafluoroheptyl)-1,3-propanediamine
N,N-bis(4,4,5,5,6,6,6-heptafluorohexyl)ethylenediamine
N,N'-bis(5,5,6,6,7,7,7-heptafluoroheptyl)-1,3-propanediamine
N,N'-bis(4,4,5,5,6,6,7,7,7-nonafluoroheptyl)-1,5-pentanediamine
N,N'-bis(4,4,5,5,6,6,7,7,8,8,8-undecafluorooctyl)-4-methyl-1,7-heptanediamine
N,N'-bis(5,5,6,6,7,7,7-heptafluoroheptyl)-1,4-butanediamine
N,N-bis(7,7,8,8,9,9,9-heptafluorononyl)-N',N'-dipropyl-1,6-hexanediamine
N,N-bis(5,5,6,6,7,7,7-heptafluoroheptyl)-N-methyl-1,8-octanediamine
N,N'-bis(5,5,6,6,7,7,8,8,9,9,10,10,11,11,11-pentadecafluoroundecyl)-1,3-propanediamine Examples of the presently provided tris(polyfluoroalkyl)-substituted amines are:

N,N,N'-tris(5,5,6,6,7,7,7-heptafluoroheptyl)-1,3-propanediamine
N,N,N'-tris(7,7,8,8,9,9,9-heptafluorononyl)-N'-ethyl-1,4-butanediamine
N,N,N'-tris(5,5,6,6,7,7,8,8,8-nonafluorooctyl)-1,5-pentanediamine
N,N,N'-tris(4,4,5,5,6,6,7,7,8,8,8-undecafluorooctyl)-1,7-hexanediamine
N,N,N'-tris(5,5,6,6,7,7,7-heptafluoroheptyl)-N'-butyloctanediamine
N,N,N'-tris(5,5,6,6,7,7,7-heptafluoroheptyl)-ethylenediamine
N,N,N'-tris(5,5,6,6,7,7,7-heptafluoroheptyl)-1,3-propanediamine
N,N,N'-tris(5,5,6,6,7,7,7-heptafluoroheptyl)-N'-(2-ethylhexyl)-3-ethyl-1,5-pentanediamine
N,N,N'-tris(4,4,5,5,6,6,7,7,8,8,9,9,10,10,10-pentadecafluorodecyl)-1,4-butanediamine.

Examples of tetrakis(polyfluoroalkyl)-substituted diamines which are provided by this invention are:

N,N,N',N'-tetrakis(4,4,5,5,6,6,7,7,7-nonafluoroheptyl)-1,5-pentanediamine
N,N,N',N'-tetrakis(5,5,6,6,7,7,7-heptafluoroheptyl)-ethanediamine
N,N,N',N'-tetrakis(7,7,8,8,9,9,9)-heptafluorononyl)-1,3-propanediamine
N,N,N',N'-tetrakis(4,4,5,5,6,6,7,7,8,8,8-undecafluorooctyl)-2-methyl-1,3-propanediamine
N,N,N',N'-tetrakis(5,5,6,6,7,7,8,8,9,9,10,10,10-tridecafluorodecyl)-4-ethyl-1,7-pentanediamine
N,N,N,N'-tetrakis(5,5,6,6,7,7,7-heptafluoroheptyl)-1,4-butanediamine
N,N,N',N'-tetrakis(4,4,5,5,6,6,6-heptafluorohexyl)-1,8-octanediamine
N,N,N',N'-tetrakis(5,5,6,6,7,7,7-heptafluoroheptyl)-1,6-hexanediamine
N,N-bis(4,4,5,5,6,6,6-heptafluorohexyl)-N',N'-bis(7,7,8,8,9,9,10,10,11,11,12,12,13,13,13-pentadecafluorotridecyl)-1,4-butane.

Reaction of the alkylenediamines with the polyfluoroalkyl halide takes place by simply contacting the amine with the halide at ambient temperature or with heating. In some instances, reaction rate is accelerated by heating and, particularly when working with the higher molecular weight compounds, temperatures, of from, say 50° C. to refluxing are advantageously employed. With the lower amines, the reaction may be slightly exothermic, but external heating may be used for the purpose of decreasing reaction time. Generally, temperatures of from, say 40° C. to 140° C. are useful.

Advantageously, the reaction is conducted in the presence of an inert, organic liquid diluent or solvent, and when such diluent or solvent is employed, operation at the refluxing temperature of the reaction mixture, at least toward the end of the reaction, is a convenient means of assuring completion of the reaction within an economically feasible length of time. Examples of suitable diluents are the lower alkanols, e.g., methanol, ethanol or isopropanol, dioxane, diethylene glycol dimethylether, ethyl ether, 1,2-dimethoxyethane, dimethylformamide, etc.

A catalyst may or may not be used. Operation in the presence of a basic agent is recommended, since the basic material serves as scavenger for the by-product hydrogen halide. The basic agent may be inorganic or organic, but obviously it should not be an extraneous amine which contains labile hydrogen, since such a material would tend to react with the polyfluoroalkyl halide; e.g., a primary or secondary amine should not be used. Examples of suitable basic agents in presence of which the reaction is conducted are, e.g, the tertiary alkylamines such as triethylamine, tripentylamine; the heterocyclic nitrogen bases such as N-methylmorpholine, pyridine, alkali or alkaline earth metal oxides or the basic salts thereof such as sodium, potassium, lithium, calcium or magnesium oxides, carbonates, acetates, etc All of the reaction conditions, i.e, whether or not a diluent is employed and the nature of the diluent if one is used, basic agent, temperature, etc., can be readily arrived at by easy experimentation. Progress of the reaction can be followed by sampling the reaction mixture at intervals and determining the content of the desired product, e.g., by spectrochemical analysis, boiling point, etc. Thus, arrival at optimum reaction conditions is simply a matter of routine procedure by one skilled in the art. To assure complete reaction in experimental runs, it is generally recommended that the temperature of the reaction mixture be increased after sufficient time has elapsed for any exothermic reaction to have occurred.

As has already been pointed out, the extent of substitution by the polyfluoroalkyl group at the amino nitrogen can be controlled to favor a predominance of one product, by regulating the molar ratio of polyfluoroalkyl halide to the diamine reactant. Hence the reactants are advantageously employed in stoichiometric proportions calculated to give mono-, di-, tri- or tetra-substitution. However, particularly for the preparation of the tetrakis-(polyfluoroalkyl) compounds, an excess of the halide reactant may be employed. An excess of the diamine component is useful for obtaining a predominance of mono-substitution. In preparing the di, tri- or tetra-substituted products, there may be used either simultaneously or stepwise, two or more different polyfluoroalkyl halides, e.g., the alkylenediamine may first be reacted with one mole of 7,7,8,8,9,9,9-heptafluoro-1-iodononane to obtain mono-substitution at one of the amine nitrogens, and the mono-substituted product may then be reacted with another halide, say 5,5,6,6,7,7,7-heptafluoro-1-iodoheptane to give with, say, 1,4-butanediamine, the N-(7,7,8,8,9,9,9-heptafluorononyl)-N,N',N'-tris(5,5,6,6,7,7,7-heptafluoroheptyl)-1,4-butanediamine.

The presently provided polyfluoroalkyl-substituted alkylenediamines range from waxy or crystalline solids to viscous or highly fluid liquids. Of particular importance are the tetrakis(polyfluoroalkyl)alkylenediamines, since they are generally fluids over a wide temperature range and possess very good thermal stability. Said tetrakis compounds as well as compounds containing from 1 to 3 polyfluoroalkyl groups with the remaining amino hydrogens being replaced by alkyl, are useful as functional fluids. Many of the compounds remain liquid at temperatures which may be as low as, say, —65° F., and they remain liquid at temperatures which are substantially higher than 500° F. Hence they are eminently suited for use as hydraulic fluids. The tetrakis(polyfluoroalkyl)-alkylenediamines possess good viscosity/temperature relationships, and generally are useful e.g., as hydraulic fluids, heat-exchange media, lubricants, and gyro fluids. Those tetra-substituted compounds which have one or more alkyl substituents at the amino nitrogen are similarly useful.

Those of the presently provided compounds which possess at least one secondary or primary amino group, i.e., the partially substituted diamines, posses anti-oxidant and extreme pressure resisting properties when added to hydrocarbon oil lubricants. Compositions comprising the tetrakis compounds predominantly and containing a small amount of the said partially substituted compounds are particularly desirable functional fluids.

Crude mixtures of product obtained by reaction of alkylenediamines with the polyfluoroalkyl halide, which mixtures comprise products having various degrees of substitution, thus possess built-in antioxidants and extreme-pressure resisting agents by virtue of the presence of the partially substituted alkylenediamines.

The presently provided polyfluoroalkyl alkylenediamines, generally, i.e., the N, or the N,N-, or the N,N'- or the N,N,N'- or the N,N,N',N'- compounds are useful as additives to lubricants and other functional fluids for the purpose of imparting antioxidant and lubricity properties thereto. Thus, they may be admixed with petroleum lubricants, or with synthetic lubricants, e.g., the polyesters or polyphenyl ethers to give lubricant compositions of improved stability and utility.

The invention is further illustrated by, but not limited to the following examples:

Example 1

Approximately one-half of a 106 g. (0.3 mole) portion of 5,5,6,6,7,7,7-heptafluoro-1-iodoheptane was added to a solution of 5.55 g. (0.075 mole) of 1,3-propanediamine in about 40 ml. of ethanol. The mixture was heated to 70° C., and after about an hour at this temperature, it became white and fairly viscous and contained some solids. Heating with stirring, at 70° C. was continued for about 3 days, during which time the remainder of the heptafluoroiodo-heptane and 41.4 g. (0.3 mole) of potassium carbonate was added. After cooling and filtering, the filtrate was diluted with water and extracted with ether. The ether extract was dried with sodium sulfate, filtered and distilled to give the substantially pure N,N,N',N'-tetrakis-(5,5,6,6,7,7,7-heptafluoroheptyl)-1,3-propanediamine, B.P. 160° C./0.05 mm., $n_D^{25}$ 1.3640, and analyzing as follows:

| Percent | Found | Calcd. for $C_{31}H_{38}F_{28}N_2$ |
| --- | --- | --- |
| C | 38.61 | 38.36 |
| H | 4.10 | 3.95 |
| N | 2.74 | 2.89 |

Example 2

5,5,6,6,7,7,7-Heptafluoro-1-iodoheptane (25 g., 0.07 mole) was mixed with 20 g. (0.3 mole) of ethylenediamine. An exothermic reaction began soon after mixing, and the reaction mixture turned white and formed two phases. The whole was then allowed to stand at room temperature for several days and then washed with a solution of 3.5 g. of sodium hydroxide in 15–20 ml. of water. The washed material was extracted with ether, and the ether extract was distilled to give 11.5 g. (57% yield) of the substantially pure N-(5,5,6,6,7,7,7-heptafluoroheptyl)ethylenediamine, B.P. 110°/20 mm., $n_D^{25}$ 1.3775 having a neutralization equivalent of 293.5 as against 284, the calculated value.

Example 3

Testing of the N,N,N',N'-tetrakis(5,5,6,6,7,7,7-heptafluoroheptyl)-1,3-propanediamine of Example 1 for efficacy as a functional fluid was conducted by determining such characteristics as kinematic viscosity, pour point, decomposition point, flash point, fire point, and autogenous ignition temperature.

Kinematic viscosity was determined by using ASTM D445–T 1960 procedure employing standard ASTM kinematic viscosity thermometers calibrated against a National Bureau of Standards resistance thermometer. At —20° F., the viscosity was found to be 5270 cps.; at —30° F. it was 12,260 cps.

The pour point, determined by ASTM D97–57 procedure was found to be —55° F.

The decomposition temperature, as determined with the isoteniscope, was found to be 471° F. The decomposition temperature is here defined as the temperature at which dp/dt (rate of pressure rise) due to decomposition of the sample is 0.014 mm. Hg/sec.

The autogenous ignition temperature, measured by ASTM procedure D–60T, and adhering to the detailed directions given by M. G. Zabetakis et al. in "Industrial and Engineering Chemistry" 46 2173 (1954), was found to be 700° F.

The flash point and the fire point, determined by ASTM D–92–57 procedure, were found to be 406° F. and 487° F., respectively.

We claim:
1. A compound of the formula

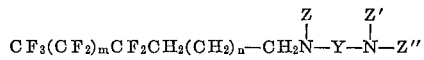

wherein $m$ is a number of 1 to 5, $n$ is a number of 1 to 4, Y is alkylene having at least 2 carbon atoms in the alkylene chain and a total of from 2 to 8 carbon atoms, and Z, Z' and Z" are selected from the class consisting of hydrogen, alkyl of from 1 to 8 carbon atoms and $CF_3(CF_2)_mCF_2CH_2(CH_2)_nCH_2$—.

2. The compound defined in claim 1 further limited in that $m$ is 1.

3. The compound defined in claim 1 further limited in that Y is —$CH_2CH_2CH_2$—.

4. N - (5,5,6,6,7,7,7 - heptafluoroheptyl)alkylenediamine having at least 2 carbon atoms in the alkylene chain and a total of from 2 to 8 carbon atoms in the alkylene group.

5. Tetrakis - N,N,N',N' - (5,5,6,6,7,7,7 - heptafluoroheptyl)alkylenediamine having at least 2 carbon atoms in the alkylene chain and a total of from 2 to 8 carbon atoms in the alkylene group.

6. N - (5,5,6,6,7,7,7 - heptafluoroheptyl)ethylenediamine.

7. Tetrakis - N,N,N',N' - (5,5,6,6,7,7,7-heptafluoroheptyl)-1,3-propanediamine.

References Cited by the Examiner
UNITED STATES PATENTS

| | | | |
|---|---|---|---|
| 2,172,822 | 9/1939 | Tamele et al. | 260—585 X |
| 2,583,588 | 1/1952 | Calvin | 252—78 |
| 2,877,184 | 3/1959 | Ragborg | 252—78 |
| 3,032,587 | 5/1962 | Halpern et al. | 260—583 |
| 3,055,953 | 9/1962 | Smeltz | 260—583 X |
| 3,077,499 | 2/1963 | Tullock | 260—583 |

CHARLES B. PARKER, *Primary Examiner.*